United States Patent
Heravi et al.

(10) Patent No.: US 7,793,767 B2
(45) Date of Patent: *Sep. 14, 2010

(54) FOUR-WHEEL DRIVE CENTER DISCONNECT ELECTRIC ACTUATOR

(75) Inventors: Oliver Heravi, Tigard, OR (US); Ernest Ozsvath, Salem, OR (US); Elaine Woods, legal representative, Keizer, OR (US); Scott Stocker, Vancouver, WA (US); Kip E. Clohessy, Milwaukie, OR (US); Bryan M. Averill, Portland, OR (US)

(73) Assignee: Warn Industries, Inc., Milwaukie, OR (US)

( * ) Notice: Subject to any disclaimer, the term of this patent is extended or adjusted under 35 U.S.C. 154(b) by 631 days.

This patent is subject to a terminal disclaimer.

(21) Appl. No.: 11/760,817

(22) Filed: Jun. 11, 2007

(65) Prior Publication Data

US 2007/0227850 A1   Oct. 4, 2007

Related U.S. Application Data

(63) Continuation-in-part of application No. 11/150,575, filed on Jun. 10, 2005, now Pat. No. 7,316,304.

(51) Int. Cl.
*F16D 28/00* (2006.01)
*F16H 37/12* (2006.01)

(52) U.S. Cl. ............... 192/20; 192/84.6; 192/84.7; 74/55

(58) Field of Classification Search ............... 192/20, 192/84.6
See application file for complete search history.

(56) References Cited

U.S. PATENT DOCUMENTS

| | | | | | |
|---|---|---|---|---|---|
| 3,132,531 | A | * | 5/1964 | Boughner | 74/335 |
| 4,428,248 | A | * | 1/1984 | Broucksou et al. | 74/335 |
| 4,895,236 | A | * | 1/1990 | Sakakibara et al. | 192/84.6 |
| 5,267,635 | A | | 12/1993 | Peterson et al. | |
| 5,605,213 | A | | 2/1997 | White | |
| 5,788,008 | A | | 8/1998 | Fort et al. | |
| 6,659,250 | B2 | * | 12/2003 | Nestler et al. | 192/84.6 |
| 7,316,304 | B2 | * | 1/2008 | Heravi et al. | 192/20 |

* cited by examiner

*Primary Examiner*—Richard M. Lorence
(74) *Attorney, Agent, or Firm*—Harness, Dickey & Pierce, P.L.C.

(57) ABSTRACT

A four-wheel drive center disconnect electric actuator is provided. The actuator includes a one-way motor that actuates a cam mechanism for causing engagement and disengagement of the center disconnect. The actuator achieves improved reliability and efficiency through a less expensive construction than conventional actuators.

15 Claims, 13 Drawing Sheets

FOUR-WHEEL DRIVE CENTER DISCONNECT ELECTRIC ACTUATOR

CROSS-REFERENCE TO RELATED APPLICATION

The present application is a continuation-in-part application of Application Ser. No. 11/150,575, now U.S. Patent No. 7,316,304, filed Jun. 10, 2005, the contents of which are incorporated by reference herein in its entirety.

FIELD OF THE DISCLOSURE

The present disclosure relates to drive lines for four-wheel drive vehicles, and more particularly, to a drive line disconnect actuator with reduced cost and improved reliability.

BACKGROUND AND SUMMARY OF THE DISCLOSURE

Four-wheel drive vehicles are popular for use off road and for providing improved traction on snowy, icy, and other slippery roads. Four-wheel drive vehicles are often provided with the capability of disconnecting the secondary driving axle in order to provide a two-wheel drive mode when using four-wheel drive mode is not beneficial. However, even in the two-wheel drive mode, many of the drive components are driven by rotation of the wheels which are in engagement with the road. Accordingly, wheel end disconnects and center disconnects have been developed in order to disconnect either the wheels or the axles from the remaining driveline system so that all of the components of the driveline are not rotated by rotation of the non-driven wheels of a four-wheel drive vehicle. It has been found that disconnection of the driveline components from the non-driven wheels can significantly reduce the amount of torque demand for driving the vehicle as well as increasing the fuel efficiency of the vehicle when operated in the two-wheel drive mode. Although suitable disconnect mechanisms have been developed for use with four-wheel drive vehicles, it is still desirable to provide a more reliable and less expensive driveline disconnect system.

Conventional driveline disconnects utilize actuators that include a threaded lead screw which is engaged by a nut follower for providing connection of the driveline disconnect. When these conventional systems are shifted into the four-wheel drive (connect) position, the force exerted by the axle return spring and/or actuator block shift spring to the actuator nut follower is transmitted back to the actuator gear train. These forces, along with vehicle vibration over long periods of time, can potentially backdrive/creep the nut follower so as to negatively impact the operation of the conventional actuator device. In addition, conventional actuators require the use of a bi-directional motor for moving the driveline disconnect between the connected and disconnected positions. The bi-directional motion in these conventional actuators applies excessive stress on the motor, shafts, gears, and supporting joints, especially during a rapid shift cycle. Hence, these excessive stresses deteriorate the actuator's life and performance. Additional components and electrical circuitry are required that contribute to added cost and complexity. The travel of a nut follower, in conventional actuators, is also constrained by a mechanical stop. This mechanical stop creates a potential for the actuator to be jammed. Furthermore, in the conventional actuator, the motor needs to develop a high torque level at the beginning of a shift that applies undesirable stresses on the motor and other actuator components.

The disconnect actuator of the present invention provides the force and stroke required by a coupling member to engage and disengage a coupler for providing connection between a first and second rotatable member. A one-way electric motor is utilized and is operable to drive a gear mechanism and associated cam mechanism. A cam follower is engaged with the cam mechanism and is supported for linear motion relative to the cam mechanism and is engageable with the coupler device for moving the coupler to one of an engaged and disengaged position. The cam mechanism and cam follower are arranged such that rotation of the cam mechanism in 180 degree increments provides connection and subsequent disconnection of the coupler device while utilizing the one-way motor. The driveline disconnect actuator of the present invention utilizes a relay switch (for example, a single pole double-throw) with a stationary encoder and a rotating wiper that provides a relatively simple low cost switching circuit as compared to the costly electronic circuitry typically required for conventional actuators using bi-directional motor control.

Furthermore, the system of the present invention is immune to the backdrive phenomenon associated with conventional actuators in that the rotation of the worm/cam from 0 to 180 degrees transfers into linear displacement of the cam follower to cause a shift from a two-wheel drive operating mode to a four-wheel drive operating mode. The rotation of the worm gear from 180 degrees to 360 degrees transfers into linear displacement of the cam follower to cause a shift from the four-wheel drive mode to a two-wheel drive mode. Therefore, either at the 0 or the 180 degree position of the cam, the exerted forces are transmitted to the worm gear, supporting pin, and the housing and do not contribute to a backdrive phenomenon as experienced with conventional actuators.

The use of a one-way motor also improves the disconnect actuator's performance and reduces the cost. Because the motor and gear train rotate in one direction only, it reduces the stress on the motor, shaft, gears, and supporting joints. The bi-directional motion in conventional actuators applies excessive stress on the motor, shafts, gears, and supporting joints.

The driveline disconnect actuator of the present invention also eliminates the problem of jamming, since the use of a 180 degree rotating cam mechanism does not utilize a mechanical stop, there is no potential for jamming. Finally, since the actuator linear displacement of the present invention is the sine function of a one gear angular rotation, and since the motor's peak torque is at 90 degree rotation of the worm gear, the motor starts up with ease since at start-up, minimum torque is required. At the start of any shift, the present invention allows the motor to accelerate to high speed before approaching a peak torque. However, in conventional actuators, the motor needs to develop a higher torque immediately at a beginning of a shift. Furthermore, the worm gear drive of the present invention is less noisy than a conventional planetary gear system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
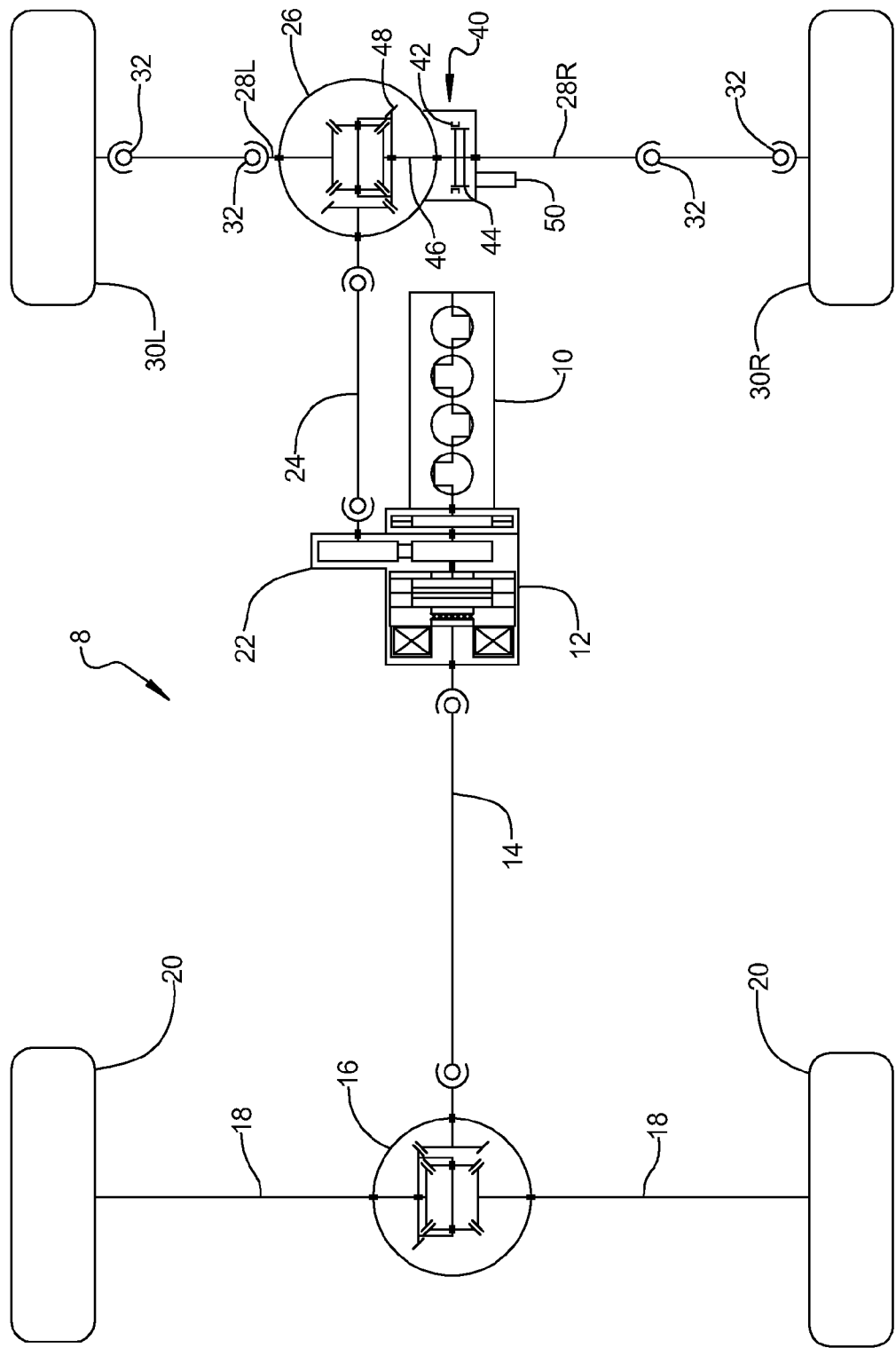
FIG. 1 is a schematic diagram of a vehicle driveline incorporating a center disconnect electric actuator, according to the principles of the present invention.

With reference to FIG. 1, an exemplary vehicle driveline 8 for a four-wheel drive vehicle incorporating a center disconnect electric actuator, according to the principles of the present invention, will now be described. The rotative power of the vehicle engine 10 is transmitted to the rear wheels 20 by the transmission 12 rotating the propeller shaft 14 which is coupled to the rear differential 16. Axle shafts 18 extending from the differential 16 rotate the rear wheels 20. The rotative power of the engine 10 is transmitted to the front wheels 30 by a transfer case 22 (coupled to the transmission 12) that selectively rotates the front propeller shaft 24 coupled to the front differential 26. Axles 28L, 28R extending from the front differential 26 rotate the front wheels 30L, 30R, respectively. As is known in the art, the transfer case 22 has a shift mechanism to selectively provide rotative power to the front propeller shaft 24 or not to provide rotative power. Thus, the vehicle may be operated in two-wheel drive or four-wheel drive mode depending on the shift selection of the transfer case 22.

The front wheels 30L, 30R of the vehicle are steerable and the vehicle is provided with steering knuckles, generally known in the art. The front axles 28L, 28R extend from the front differential and are provided with universal joints 32 to accommodate the steering capability. The center disconnect device 40 is provided between one of the axle shafts 28R and the differential 26. The center disconnect 40 includes a shift fork 42 and coupler sleeve 44 which is operable to provide an engaged position and a disengaged position relative to the axle shaft 28R and the differential output shaft 46. The center disconnect 40 allows the axle shaft 28R to be disconnected from the differential 26 so that in the two-wheel drive operating mode, the rotation of the front wheels 30L, 30R in contact with the road and the associated rotation of the axle shafts 28L, 28R can be isolated from other driveline components such as the front propeller shaft 24 and differential ring gear 48. An actuator device 50 is mounted to the housing of the center disconnect 40 for providing actuation of the center disconnect 40 between the engaged and disengaged positions.

Figure 2:
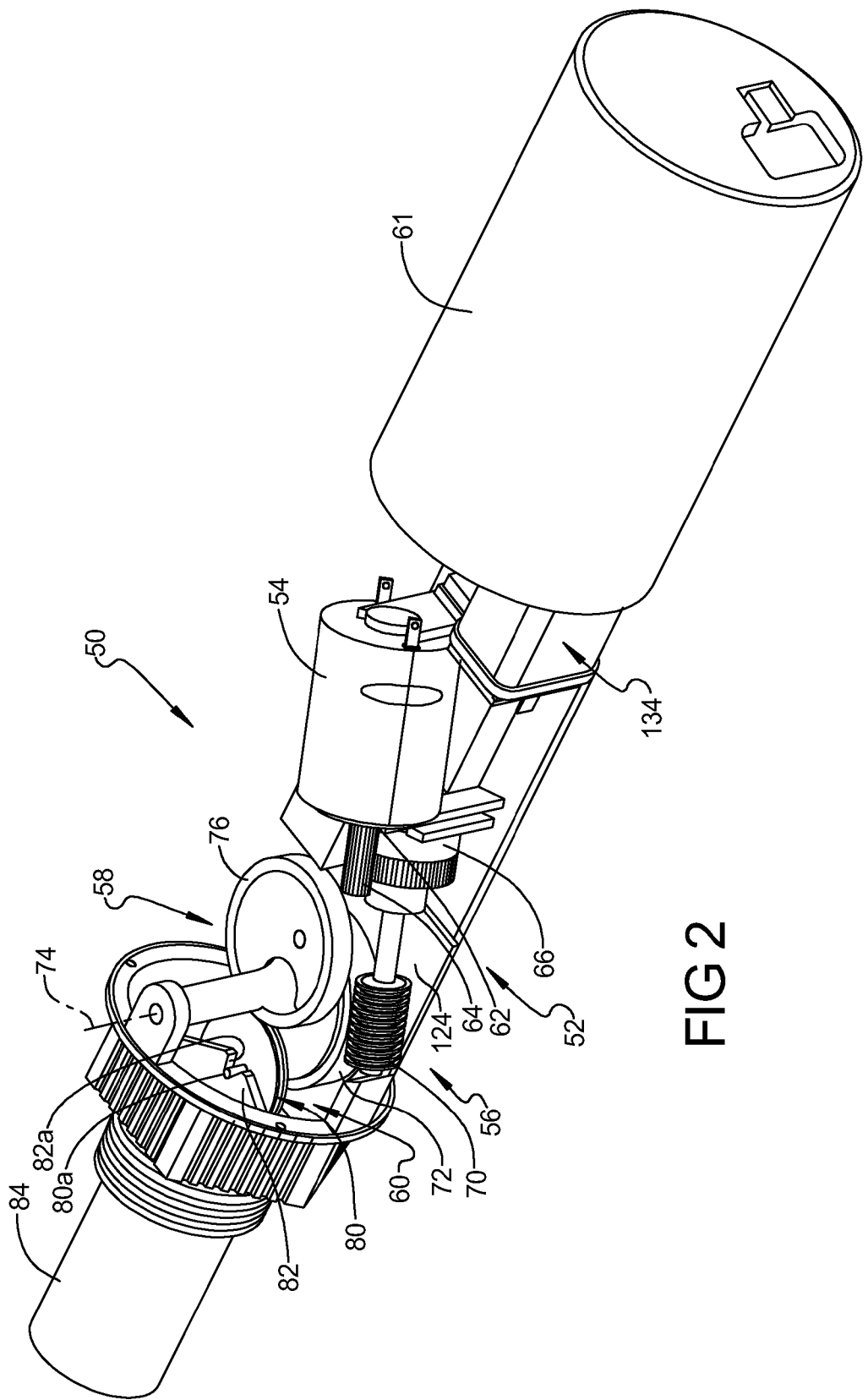
FIG. 2 is a perspective view of the disconnect actuator, according to the first embodiment of the present invention.
Figure 3:
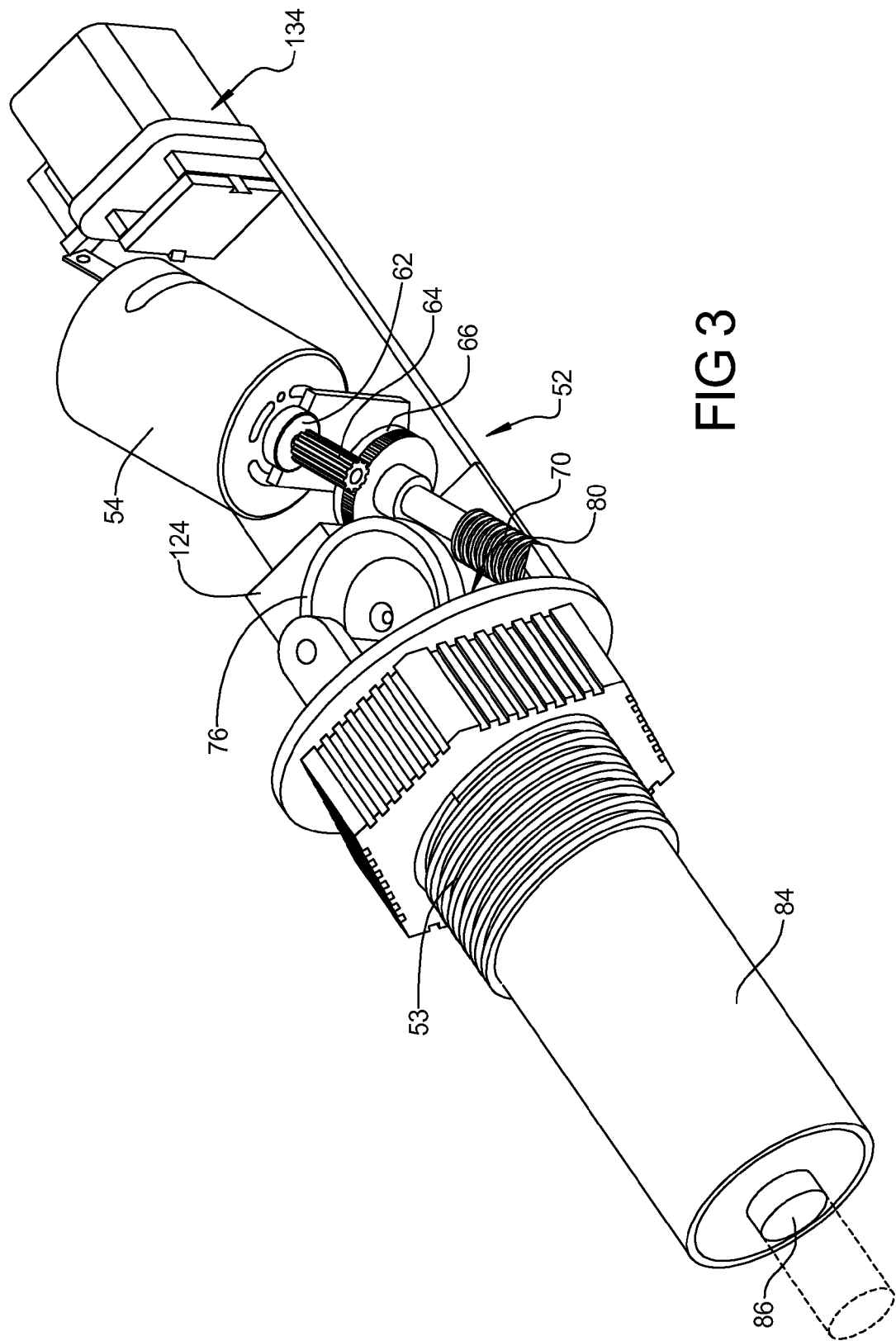
FIG. 3 is a perspective view from a different angle of the center disconnect actuator, according to the principles of the present invention.
Figure 4:
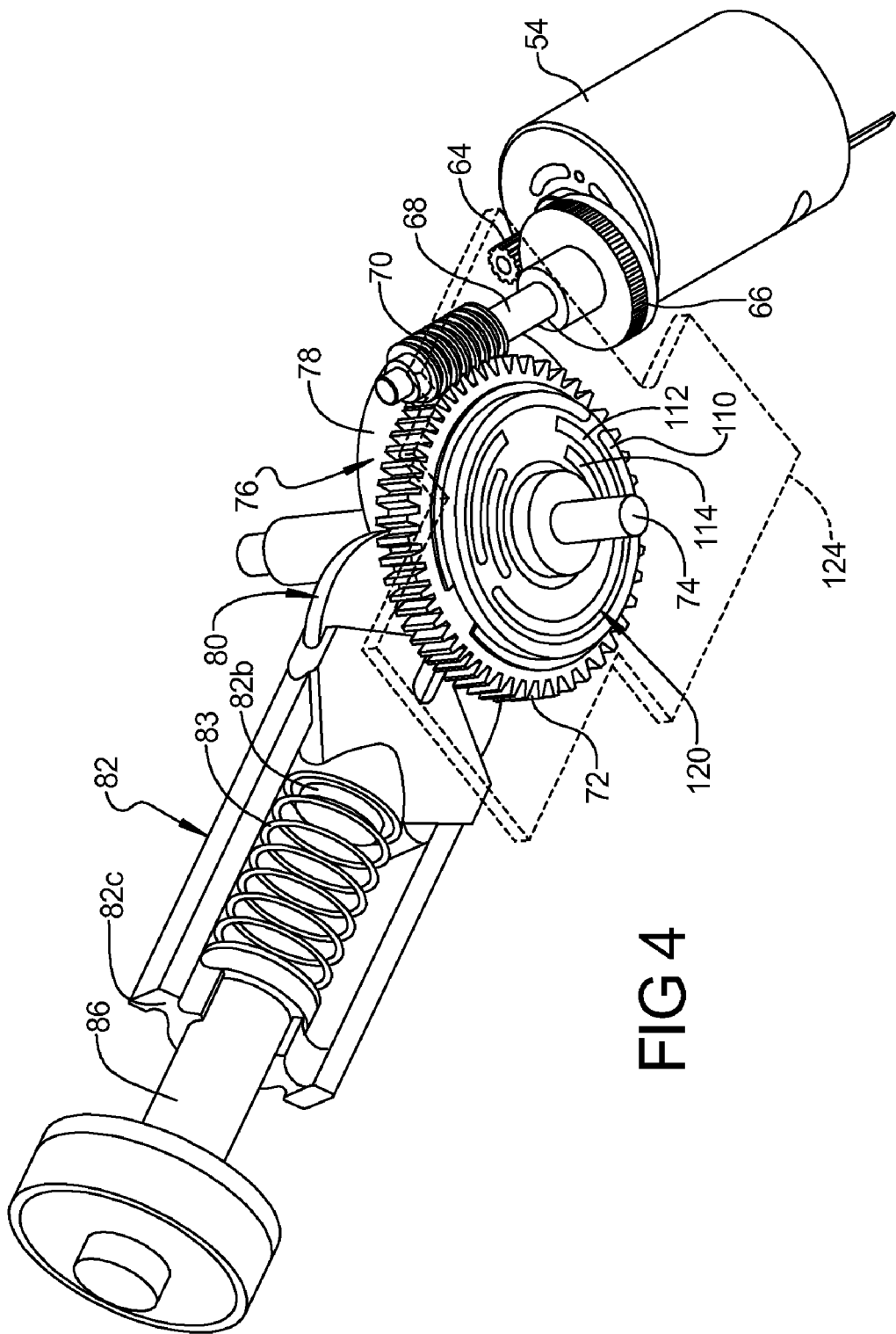
FIG. 4 is a bottom perspective view of the disconnect actuator, with the housing removed to better illustrate the components thereof.

With reference to FIGS. 2-4, the driveline disconnect actuator, according to the first embodiment of the present disclosure, will now be described. The driveline disconnect actuator 50 includes a housing 52 which is connected to the housing of the disconnect mechanism 40 by threaded interface 53. A motor 54 is drivingly engaged with a gear mechanism 56 which is drivingly engaged with an eccentric cam mechanism 58 which in turn engages a cam follower mechanism 60. A cover 61 mounts to the housing 52.

The motor 54 includes an output spindle 62 having a drive gear 64 mounted thereon. Drive gear 64 is meshingly engaged with a driven gear 66 which is larger in diameter and includes more teeth than the drive gear 64. The motor and gear mounting are provided in an angled orientation on the housing 52 in order to conserve space. Driven gear 66 is mounted to, and rotatable with, an intermediate shaft 68 that includes a worm 70 fixedly mounted thereto. Worm 70 meshingly engages a worm gear 72 which is rotatably mounted to the housing 52 about an axis 74. An eccentric cam member 76 is fixedly mounted to the worm gear 72 and rotatable about axis 74. Eccentric cam 76 includes an outer surface 78 which engages a cam follower 80. The cam follower 80 is engaged with a linkage 82 which is slidably received in a forward housing portion 84 of housing 52. As best shown in FIG. 2, the linkage 82 includes a slot portion 82a which slidably receives a spindle 80a on the cam follower 80. The linkage 82 further includes a spring boss portion 82b which receives an end of a spring 83 that engages a plunger 86 at a second end thereof. As seen in FIG. 4, the plunger 86 is slidably received in the second end 82c of the linkage 82. The spring 83 allows the linkage 82 to be moved along with the cam follower 80 even when the plunger 86 is unable to move due to the coupler sleeve 44 being misaligned. Once the coupler sleeve 44 is aligned for engagement, the spring 83 applies a biasing force to engage the coupler sleeve 44.

Upon rotation of the motor 54, the drive gear 64 drives driven gear 66 which causes rotation of worm 70 to drive worm gear 72 for causing eccentric cam member 76 to rotate about axis 74. As eccentric cam member 76 rotates, engagement between the cam 76 and cam follower 80 causes linear movement of the cam follower 80 and linkage 82 which, in turn, causes plunger 86 (connected to the linkage 82) to extend from the forward housing portion 84 as illustrated in FIG. 3. The plunger 86 engages the shift fork 42 of the center disconnect device 40 in order to cause engagement of the center disconnect. The shift fork 42 is normally spring biased to a disengaged position so that when the plunger 86 is retracted, the shift fork 42 and coupler sleeve 44 are automatically moved out of the engaged position.

It should be understood that the gear mechanism 56 provides a gear reduction between the motor 54 and cam mechanism 58, and that other alternative gear mechanisms could be utilized for providing the same or different gear reduction function as required by a specific application. Furthermore, the cam mechanism and cam follower, as illustrated, generally disclose a circular cam eccentrically rotatable about an axis 74, while other shapes of cam mechanisms could also be utilized without departing from the spirit and scope of the present invention.

Figure 5:
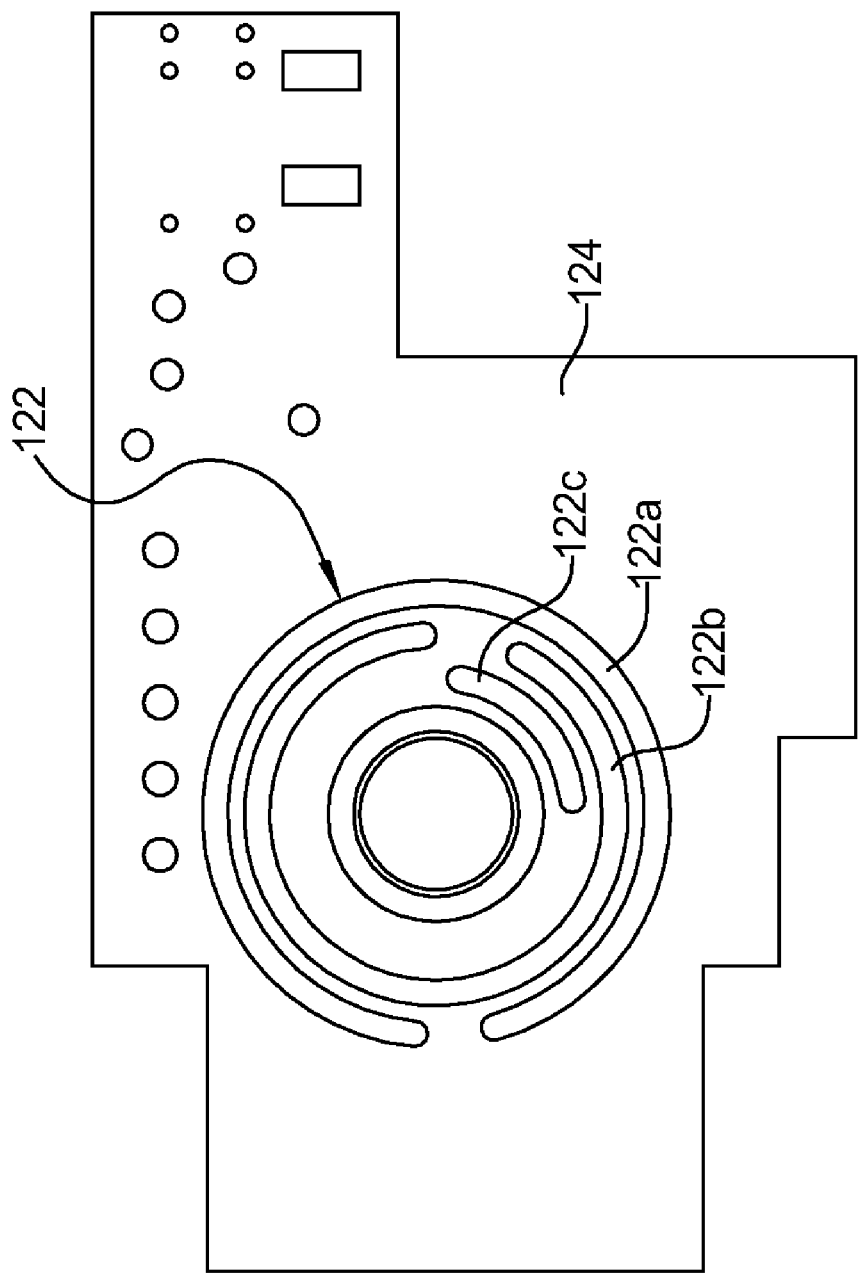
FIG. 5 is a schematic plan view of the printed circuit board of the present invention showing the trace pattern of the encoder/wiper utilized in the controller according to the principles of the present invention.
Figure 6:
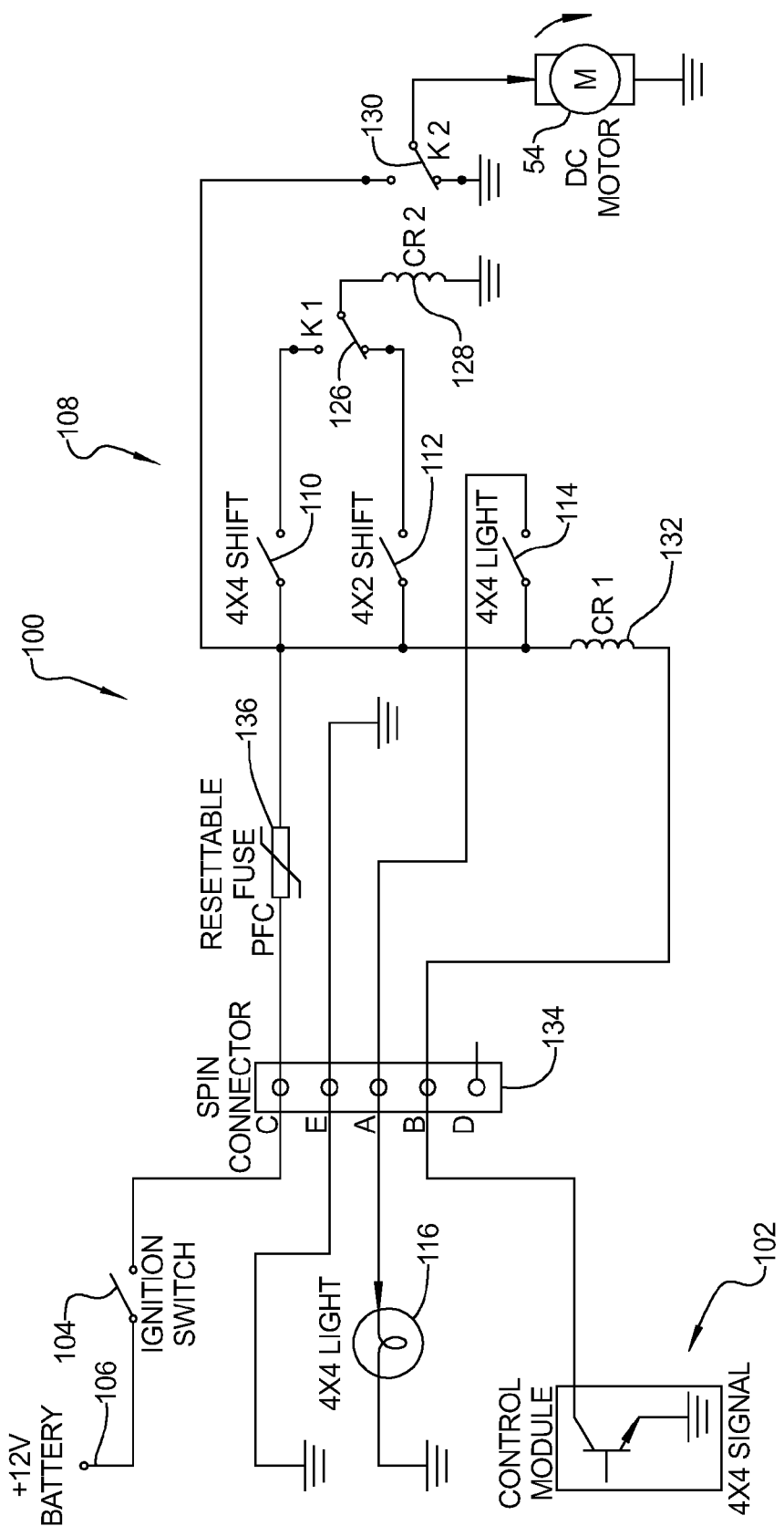
FIG. 6 is a schematic diagram of an electric control circuit according to the principles of the present invention.

With reference to FIG. 6, driveline disconnect actuator includes a control circuit 100 for controlling the electric motor 54 in response to a vehicle command signal obtained by user activation of "4×4/4×2" selector switch of the control module 102. The ignition switch 104 provides electric current from battery 106 to the control circuit 100. When the ignition switch 104 is closed, electric current is supplied to an encoder/wiper module 108. The encoder/wiper module 108 includes a "4×4 shift" contact 110 and a "4×2 shift" contact 112. The encoder/wiper module 108 also provides current to a "4×4 light" contact 114 for activating a "4×4" indicator light 116 for indicating to the driver when the vehicle is in four wheel drive mode. The "4×4 shift," "4×2 shift," and "4×4 indicator" contacts 110, 112, 114 are all disposed on the encoder/wiper switch mechanism 120 disposed below the worm gear 72, as best illustrated in FIG. 4. The encoder/wiper switch mechanism 120, including contacts 110, 112, 114, selectively engages corresponding electric traces 122 (best shown in FIG. 5) disposed on the printed circuit board 124. Traces 122a, 122b, 122c correspond respectively to contacts 110, 112, 114 of encoder/wiper switch mechanism 120.

The control circuit 100 also includes a signal relay switch 126 which communicates between "4×4 shift" contact 110, "4×2 shift" contact 112 and a power relay coil 128. A power relay switch 130 is associated with the power relay coil 128 and is in communication with the motor 54. A signal relay coil 132 is associated with the signal relay switch 126. The control circuit 100 includes a 5 pin connector 134 (mounted to the housing 52) for making connection between the control circuit 100 and battery 106, 4×4 light 116 and control module 102. The control circuit 100 can also include a resettable fuse 136 in order to prevent overload of the circuit 100.

In operation, the signal relay coil 132 is energized by a 4×4 signal from the vehicle control module 102. The energized signal relay coil 132 causes the normally open contact of signal relay switch 126 to close and supply power to the power relay coil 128 through the encoder-wiper "4×4 shift" contact 110 engaging trace 122a. Consequently, the normally open contact of power relay switch 130 is closed, so it can supply power to the motor 54. The motor 54 stays energized until the encoder/wiper "4×4 shift" contact 110 with trace 122a is opened at 180-degree rotation of worm gear 72. Therefore, upon completion of 180 degree rotation to the 4×4 position, the power relay coil 128 is de-energized and its normally closed power relay switch 130 provides a ground potential to the motor 54. This applies an effective dynamic braking for the motor 54 that prevents motor coasting.

At the "4×4" position, the encoder/wiper "4×4 light" contact 114 is closed by contact with trace 122c to provide current to the 4×4 indicator light 116, and the 4×2 shift contact 112 with trace 122b is closed to set the cycle ready for the next shift from 4×4 to 4×2.

For shifting from 4×4 mode to 4×2 mode, the actuator's signal relay coil 132 is de-energized by the 4×4 signal from the vehicle control module 102. This causes the normally closed contact of signal relay switch 126 to supply power to the power relay coil 128 through the encoder/wiper 4×2 shift contact 112 with trace 122b. Consequently, the normally open contact of power relay switch 130 is closed, so it can supply power to the motor 54. The motor 54 stays energized until the encoder/wiper "4×2 shift" contact 112 with trace 122b is opened at 180-degree rotation to the 4×2 position, the power relay coil 128 is de-energized and its normally closed contact of power relay switch 130 provides a ground potential to the motor 54. This applies an effective dynamic braking for motor 54 that prevents undesirable motor coasting.

At the 4×2 position, the encoder/wiper "4×4 indicator" contact 114 with trace 122b is opened to provide 4×2 status to the vehicle (i.e., the 4×4 light is no longer illuminated), and the 4×4 shift contact 110 with trace 122a is closed to set the cycle ready for the next shift from 4×2 mode to 4×4 mode.

Referring to FIGS. 7-13, a driveline disconnect actuator, according to the second embodiment of the present disclosure, will now be described. As will become clear from the description below, the second embodiment differs from the first embodiment in that the driveline disconnect actuator of the second embodiment is more compact due to the different orientation among the motor, the gear mechanism, the cam mechanism and the plunger. In the following, like components will be indicated by like reference numerals and their description will be omitted for clarity.

Figure 7:
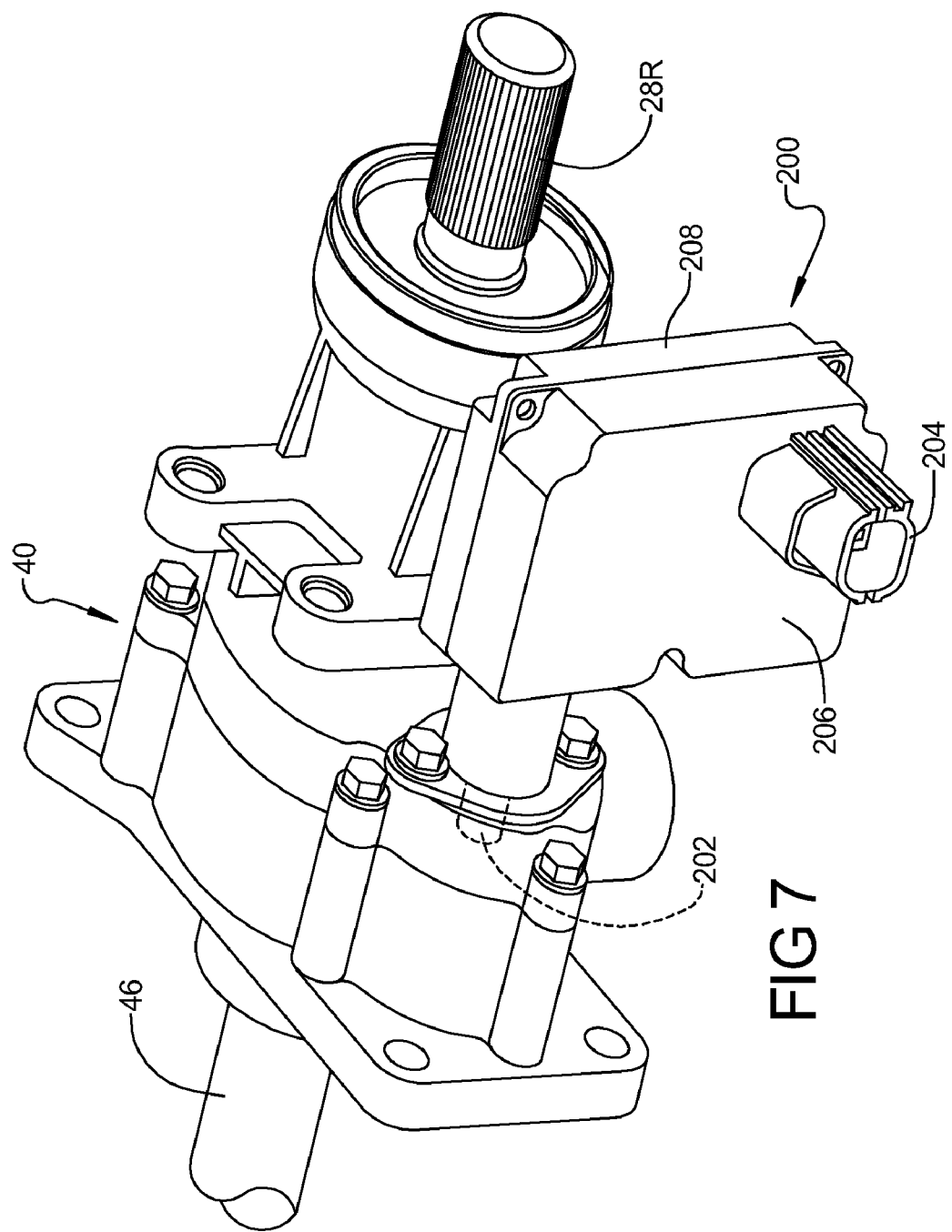
FIG. 7 is a perspective view of a part of the vehicle driveline incorporating the disconnect actuator, according to the second embodiment of the present disclosure.

As shown in FIG. 7, the driveline disconnect actuator according to the second embodiment of the present disclosure is generally indicated by reference numeral 200. The disconnect actuator 200 is disposed adjacent to the center driveline disconnect 40. The disconnect actuator 200 has a plunger 202 extending along an axis parallel to the front axle shafts 28L, 28R and a connector 204 extending perpendicularly to the front axle shafts 28L, 28R, as opposed to the disconnect actuator 50 of the first embodiment where the plunger 86 and the connector 134 extend substantially along an axis parallel to the front axle shafts 28L, 28R.

Figure 8:
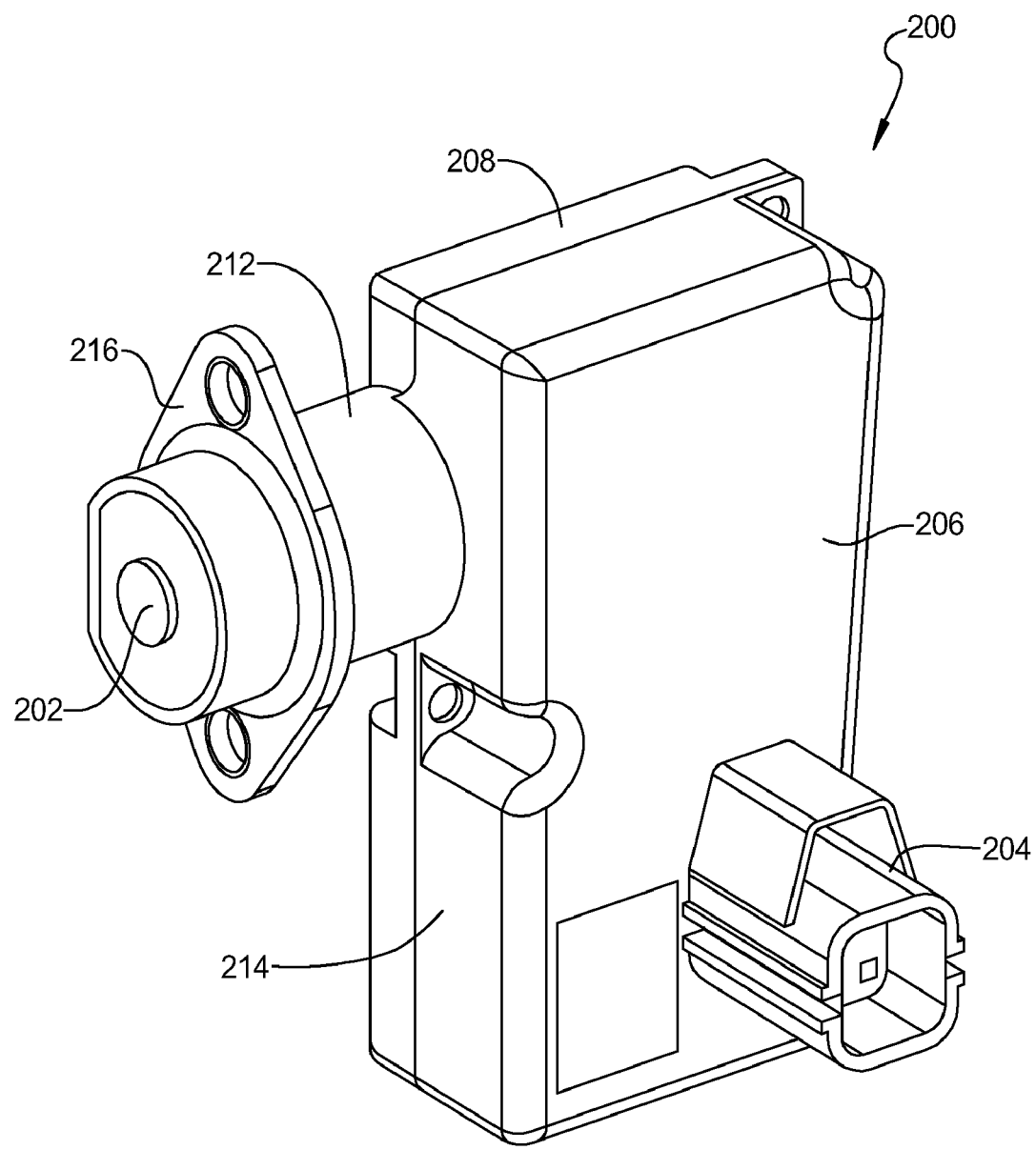
FIG. 8 is a perspective view of the disconnect actuator of FIG. 7.
Figure 9:
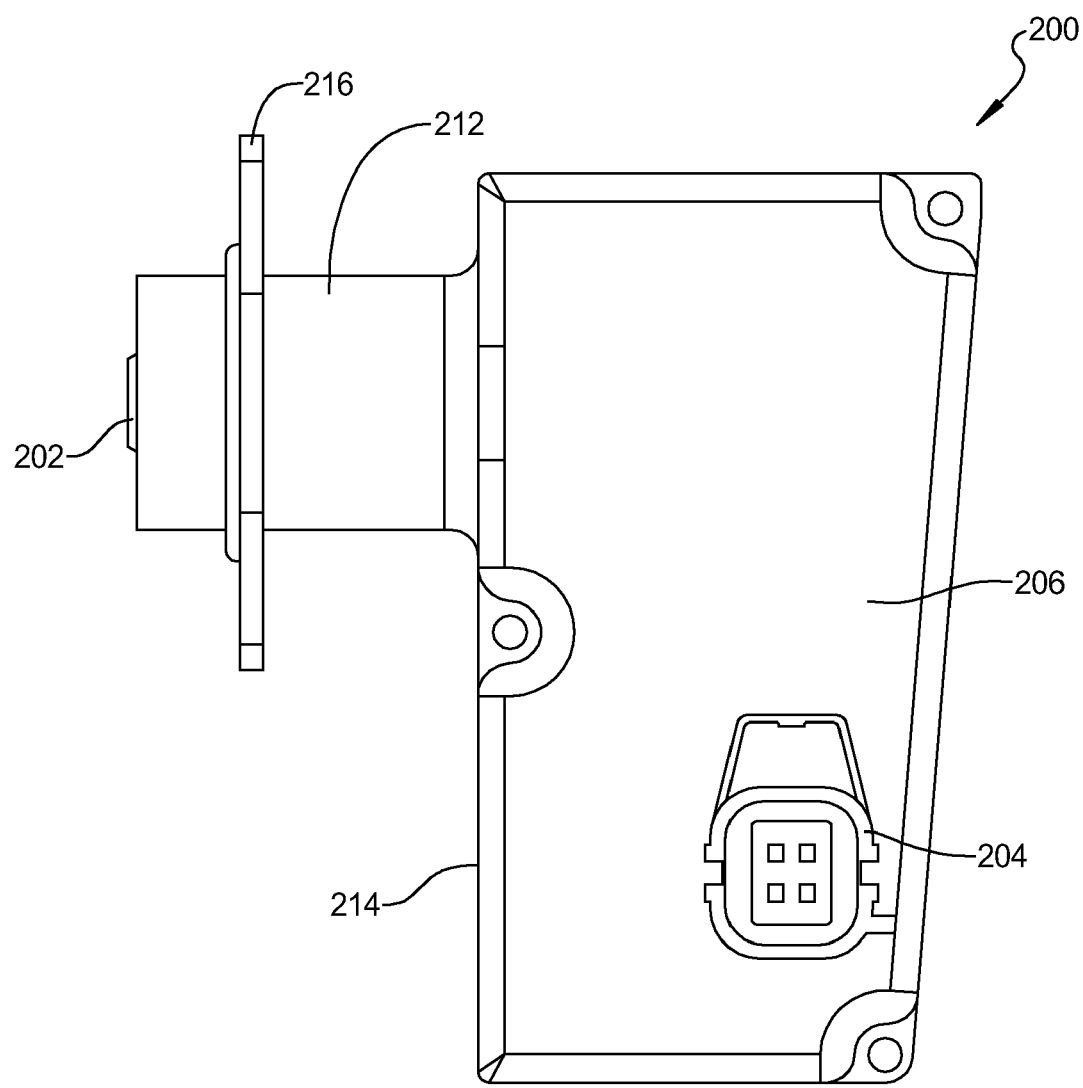
FIG. 9 is side view of the disconnect actuator of FIG. 8.

Referring to FIGS. 8 and 9, the driveline disconnect actuator 200 includes a main housing 206, and a cover 208 for closing the main housing 206, and a plunger housing 212. The main housing 206 receives a variety of driveline disconnect actuator components therein. The plunger housing 212, in which the plunger 202 is slidably received, extends laterally and substantially perpendicularly from a sidewall 214 of the main housing 206. A flange 216 is provided around the plunger housing 212 for mounting to the housing of the central disconnect 40 (see FIG. 7). The connector 204 is mounted to the main housing 206 for making connection between a printed circuit board 124 disposed inside the main housing 206, the battery 106, the 4×4 indicator light 116, and the control module 102.

Figure 10:
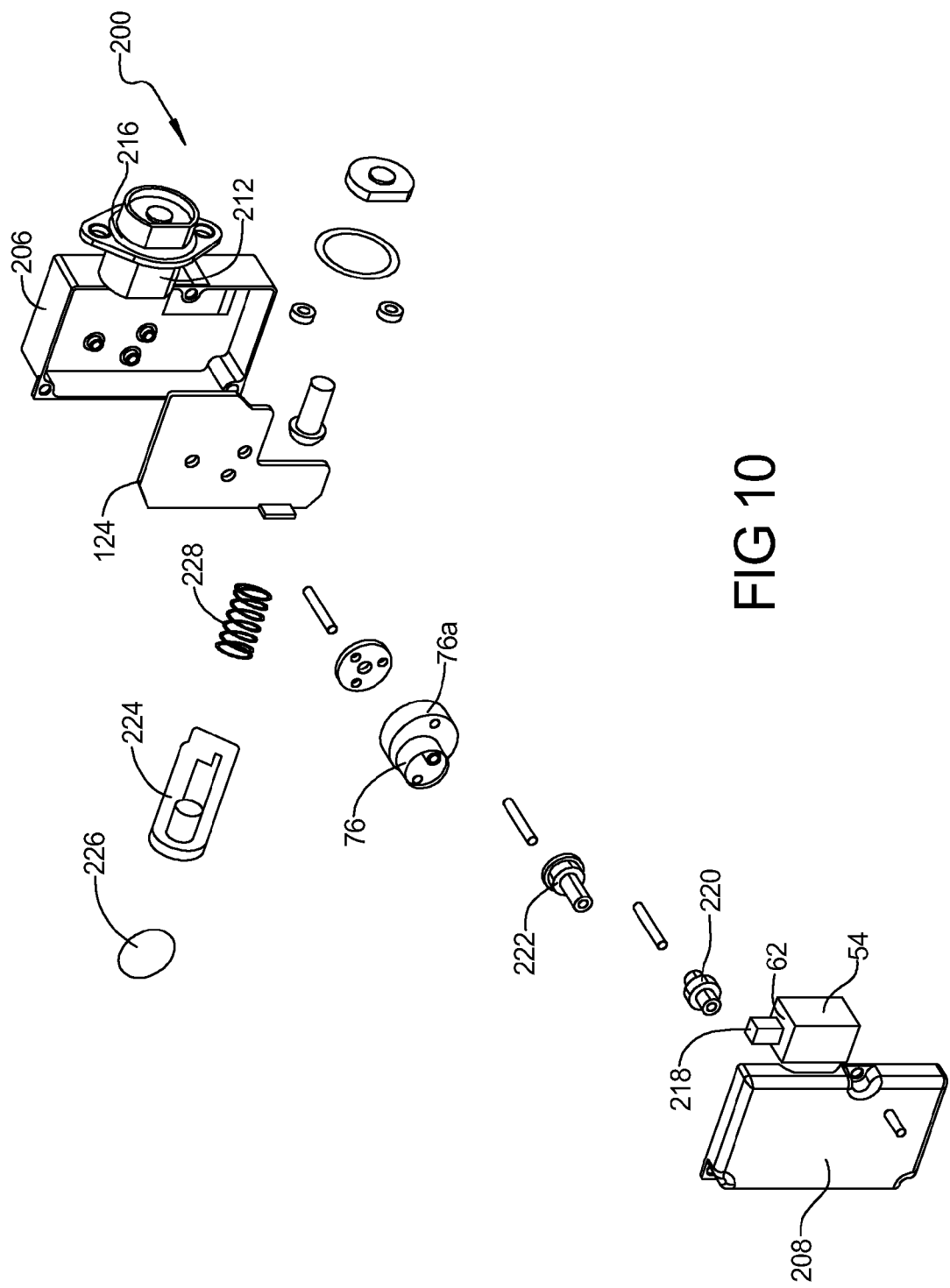
FIG. 10 is an exploded view of the disconnect actuator of FIG. 8.
Figure 11:
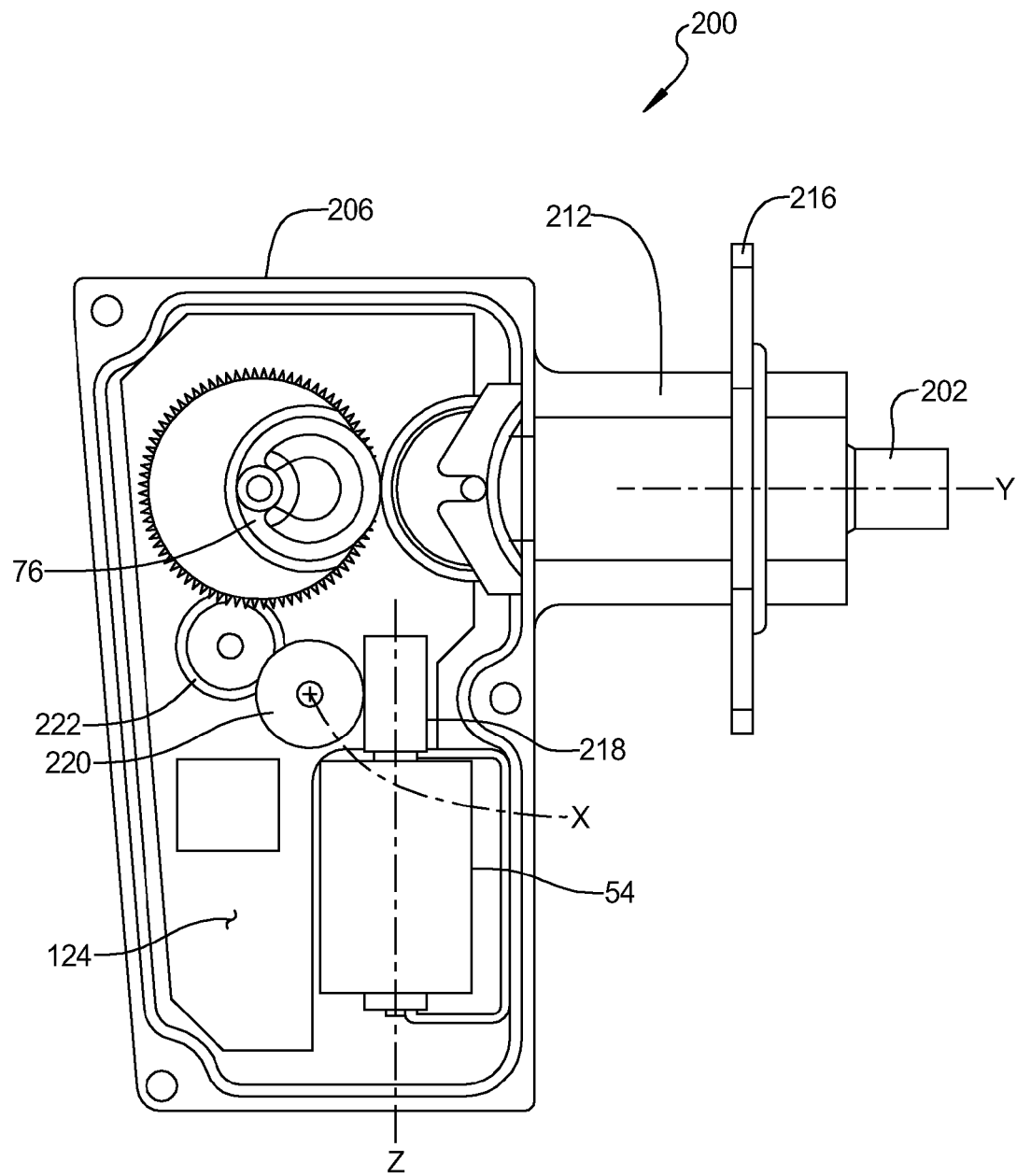
FIG. 11 is another side view of FIG. 8, where the cover is removed to show the components of the disconnect actuator.

Referring to FIGS. 10 and 11, the driveline disconnect actuator 200 includes an electric motor 54 disposed inside the main housing 206 and having an output spindle 62. The electric motor 54 is so oriented that the output spindle 62 extends upwardly. Unlike the first embodiment where a drive gear 64 is mounted on the output spindle 62, the second embodiment has a worm 218 mounted on the output spindle 62 of the motor 54. The worm 218 is meshingly engaged with a worm gear 220, which, in turn, drives a reduction gear 222. The reduction gear 222 is meshingly engaged with an eccentric cam member 76.

Figure 12:
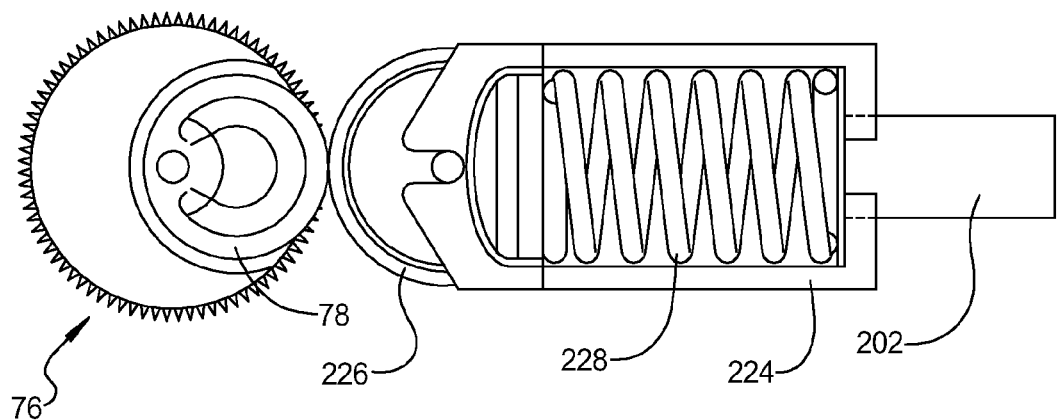
FIG. 12 is a side view of the cam mechanism, the cam follower, and the plunger.
Figure 13:
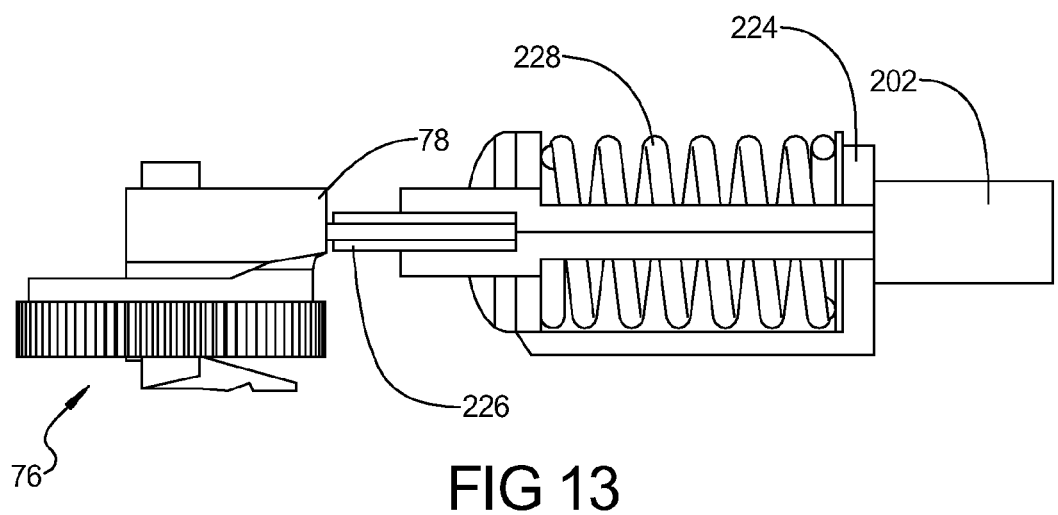
FIG. 13 is a top view of the cam mechanism, the cam follower, and the plunger of FIG. 12.

As clearly shown in FIGS. 12 and 13, the eccentric cam 76 includes an outer surface 78 which is connected to a cam follower 224 through a roller 226. A coil spring 228 is disposed in the cam follower 224 and has one end engaging the roller 226 and the other end engaging the plunger 202. As the eccentric cam member 76 rotates, engagement between the eccentric cam member 76 and the roller 226 causes a linear movement of the cam follower 224, which, in turn, causes plunger 202 to extend from the plunger housing 212. The plunger 202 engages the shift fork 42 of the center disconnect device 40 to cause engagement of the coupler sleeve 44 of the center disconnect 40. The coil spring 228 applies a biasing force against the shift fork 42 when engaged.

Referring back to FIG. 11, the worm gear 220, the reduction gear 222, and the eccentric cam 76 are driven to rotate around the same rotational direction X. The output spindle 62 of the motor 54 rotates around a rotational direction Z. The plunger 202 is driven to move along a direction Y. Directions X, Y, Z constitute the three axes of a coordinate system. With this arrangement, the driveline disconnect actuator 200 of this embodiment is made more compact, as opposed to the driveline disconnect actuator of the first embodiment where the spindle shaft of the motor, the gear mechanism, and the plunger are disposed substantially along one direction.

Figure 14:
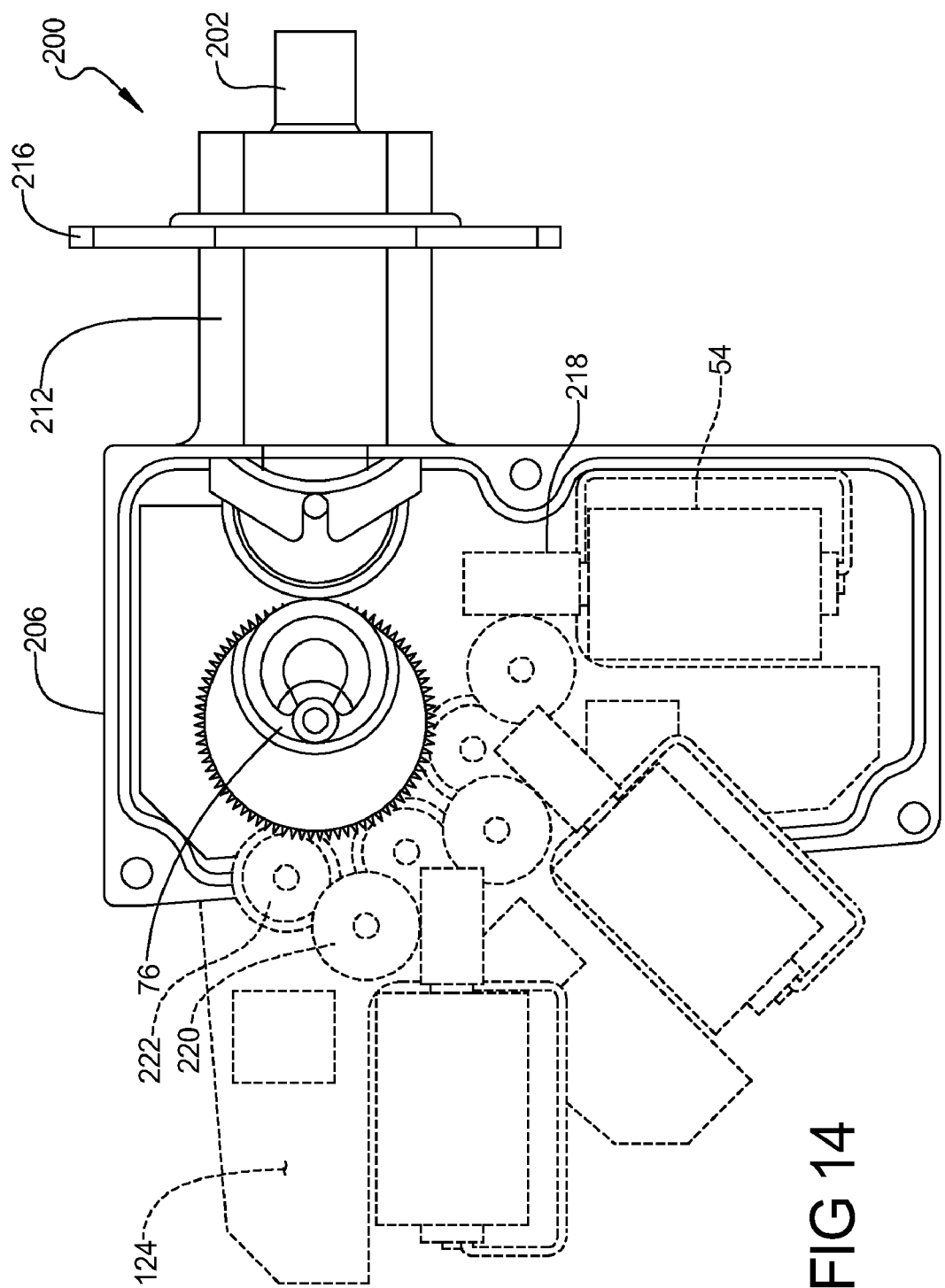
FIG. 14 is a side view of the disconnect actuator illustrating that the motor and drive train can be arranged at different orientations relative to the cam axis.

With reference to FIG. 14, the center disconnect actuator is illustrated having the motor 54 and drive train components 218, 220, 222 oriented at different locations relative to the axis of the cam 74. Implementation of a center disconnect device typically presents packaging challenges because the device is mounted to the axle housing or near the axle. Particularly, packaging is problematic where the secondary driving axles are surrounded by an engine, chassis and suspension components. In most cases, the power train crowded real estate leaves limited space for a conventional disconnect device, which can result in a major modification to the vehicle components and/or disconnect device. In response to these challenges, the actuator of the present disclosure provides a high degree of freedom by allowing the motor 54 and drive train components 218, 220, 222 to be oriented at various positions relative to the cam axis as illustrated in phantom in FIG. 14. Depending upon the desired orientation of the motor and drive train components based upon the design criteria, the housing 206 can be modified accordingly, to meet the packaging needs without requiring the remaining components to be redesigned. Consequently, this degree of freedom allows the actuator device to be flexible so it can avoid potential interferences with adjacent components without significant modification, thereby reducing development time and cost.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mechanism comprising:
    a first rotatable member;
    a second rotatable member;
    a coupler device operably engageable and disengageable for providing connection between the first and second rotatable members;
    an electric motor including an output shaft rotatable around an axis extending in a first direction; and
    a cam mechanism operatively driven by said output shaft to rotate around an axis extending in a second direction perpendicular to the first direction;
    a cam follower engaged with said cam mechanism, said cam follower being supported for linear motion relative to said cam mechanism;
    a plunger coupled to a linkage engaged by said cam follower, said plunger and said linkage moving axially with said cam follower, wherein said cam follower is disposed along an axis of said plunger, said plunger having an end portion moving axially outward relative to a plunger housing, the plunger causing the coupler device to move between an engaged position where the first rotatable member and the second rotatable member are connected, and a disengaged position where the first rotatable member and the second rotatable member are disconnected.

2. The mechanism according to claim 1, further comprising a gear mechanism disposed between the motor and the cam mechanism.

3. The mechanism according to claim 2, wherein the gear mechanism is driven to rotate around an axis extending in the second direction.

4. The mechanism according to claim 2, wherein the gear mechanism includes a worm gear and a reduction gear.

5. The mechanism according to claim 4, further comprising a worm mounted on the output shaft of the motor, the worm being meshingly engaged with the worm gear of the gear mechanism.

6. The mechanism according to claim 1, wherein the coupler device is movable in a third direction perpendicular to the first direction and the second direction.

7. The mechanism according to claim 1, wherein the motor is a one-way motor.

8. An actuator operable between an engaged position and a disengaged position for connecting two rotatable members in the engaged position and disconnecting the rotatable members in the disengaged position, the actuator comprising:
    a coupler device movable between the engaged position and the disengaged position;
    an electric motor including an output shaft rotatable about a first axis;
    a cam mechanism operatively driven by the output shaft to rotate around a second axis perpendicular to the first axis; and
    a housing having a main housing for receiving therein the electric motor and the cam mechanism and a plunger housing for receiving a plunger that engages the coupler device, the plunger housing extending transverse to the main housing and said plunger having an end portion moving axially outward relative to said plunger housing to cause the coupler device to move between the engaged position and the disengaged position.

9. The actuator according to claim 8, further comprising a gear mechanism disposed between the electric motor and the cam mechanism.

10. The actuator according to claim 9, wherein the gear mechanism is driven to rotate around the second axis.

11. The actuator according to claim 9, wherein the gear mechanism includes a worm gear and a reduction gear.

12. The actuator according to claim 11, further comprising a worm mounted on the output shaft of the motor, the worm being meshingly engaged with the worm gear of the gear mechanism.

13. The actuator according to claim 8, wherein the coupler device is movable in a third direction generally perpendicular to the first axis and the second axis.

14. The actuator according to claim 8, wherein the motor is a one-way motor.

15. The actuator according to claim 8, wherein the plunger housing is oriented perpendicularly relative to the main housing.

* * * * *